United States Patent [19]

Dudash et al.

[11] 4,250,489
[45] Feb. 10, 1981

[54] DISTRIBUTION NETWORK COMMUNICATION SYSTEM HAVING BRANCH CONNECTED REPEATERS

[75] Inventors: Allan A. Dudash; Waymon A. Melvin, Jr., both of Raleigh, N.C.; Leonard C. Vercellotti, Oakmont, Pa.

[73] Assignee: Westinghouse Electric Corp., Pittsburgh, Pa.

[21] Appl. No.: 956,516

[22] Filed: Oct. 31, 1978

[51] Int. Cl.³ .................. H04Q 9/00; H04M 11/04
[52] U.S. Cl. .................. 340/147 T; 340/151; 340/310 A
[58] Field of Search .................. 340/151, 147 T, 150, 340/163, 310 R, 310 A

[56] References Cited

U.S. PATENT DOCUMENTS

| | | | |
|---|---|---|---|
| 3,484,694 | 12/1969 | Brothman et al. | 340/151 X |
| 3,846,703 | 11/1974 | Stewart et al. | 325/53 |
| 3,854,122 | 12/1974 | Cross | 340/151 |
| 3,899,774 | 8/1975 | Binnie et al. | 340/163 |
| 3,911,415 | 10/1975 | Whyte | 340/310 A |
| 3,925,763 | 12/1975 | Wadhwani et al. | 340/164 R |
| 3,942,168 | 3/1976 | Whyte | 340/310 R |
| 3,967,264 | 6/1976 | Whyte et al. | 340/310 A |
| 3,973,087 | 8/1976 | Fong | 340/150 X |
| 3,973,240 | 8/1976 | Fong | 340/151 |
| 4,130,874 | 12/1978 | Pai | 364/514 |
| 4,131,881 | 12/1978 | Robinson | 340/151 X |

FOREIGN PATENT DOCUMENTS

1403251 8/1975 United Kingdom ............. 340/147 T

Primary Examiner—Donald J. Yusko
Attorney, Agent, or Firm—R. W. Smith

[57] ABSTRACT

Bidirectional addressable repeaters of a power line carrier communication system each include an address recognition and a receive and transmit control logic circuit having programmable zone and address identifying states for connection in plural repeating levels defining branch paths linking a central control terminal with multiple remote terminals via a distribution line network. Each repeater retransmits an interrogation message, provides its own repeater address modification, and remains in a response-wait status. The alerted repeaters define the predetermined route of branch paths for being sequentially activated by a response message. Simplified repeater response address formats are used and each repeater modified its address data upon response message retransmission. The desired sequentially occurring repeating transmissions are assured upon retransmission of both the interrogation and response messages.

6 Claims, 8 Drawing Figures

DISTRIBUTION NETWORK COMMUNICATION SYSTEM HAVING BRANCH CONNECTED REPEATERS

BACKGROUND OF THE INVENTION

1. Field of the Invention

This invention is related to power line carrier communication systems generally and, more specifically, to distribution network power line communication systems having bidirectionally addressable repeaters for providing bidirectional signal transmissions between a central control terminal and remote terminals in different geographical zones.

2. Description of the Prior Art

Considerable effort has been devoted in recent years to develop distribution network carrier communication systems due to the increased desirability of performing certain distribution automation functions, such as automatic reading of utility meters, selective load control, performing load continuity checks, and the like. However, using the distribution network as a communication link presents several problems not encountered in transmission through paths exclusively intended for communication signals nor in existing high voltage transmission line communication systems. The distribution line, along with the large number of distribution transformers attached thereto, present poor and erratically varying high frequency impedance characteristics which rapidly attenuate the communication signals, as well as introducing electrical noise and signal interference.

U.S. Pat. Nos. 3,967,264; 3,942,168 and 3,911,415, all assigned to the assignee of the present application, disclose some form of communication system via the distribution network of an electrical utility. U.S. Pat. No. 3,911,415 discloses a power line communication system having signal reconditioning and frequency translating signal repeaters coupled to the conductors of a distribution network. Remote home terminals of different geographical zones are addressable at different frequencies to simplify address coding and isolation of potentially interfering carrier signals. U.S. Pat. No. 3,967,264 describes a power line communication system which transmits carrier communication signals through addressable repeaters defining communication zones including remote terminals in corresponding geographical zones or subregions. The unique addressed repeaters modify their own address as repeated transmissions are propagated between a central control terminal and uniquely addressed remote terminals. Time delay in the repeater retransmissions avoids interfering signal reception and assurance of maintaining a single repeater in operation each repeating cycle thereof. Timed waiting is provided at last repeater for response from the remote terminal. The remote terminal logic is activated without requiring the repeater code. The repeater receivers are always on except during retransmission.

In the carrier communication system disclosed in U.S. Pat. No. 3,942,168, signal repeaters are disposed in signal communication with distribution network power line conductors at each distribution transformer site. In this system, the repeater, in addition to amplifying a signal, provides a bypass circuit for the interrogation and response signals around the associated distribution transformer which present a significant attenuation at the frequencies of the communication signals, especially in the direction from the primary to secondary winding. The repeaters also include means for delaying a received signal, with the delay time interval selected such that the amplified signal is not applied to the power line at the same time the repeater is to receive another signal. Each repeater includes two channels, each comprised of a receiver, logic and transmitter sections, for handling the bidirectinal flow of interrogation and response signals between the central communication terminal and the remote communication terminals at the customer premises.

It is desired to implement bidirectionally addressable repeaters for use in the most economical and efficient manner to assure minimum errors in message transmissions due to signal attenuation and mutual repeater interferences by utilizing the minimum of address information in a message having a predetermined message length and to require only the simplest of logic circuit arrangements for address recognition and response at each of the repeaters and at the remote terminals. Accordingly, it is required that the maximum number of repeaters be utilized at optimally spaced distances for retransmission over extended lengths of distribution network power line conductors serving locations having remote communication terminals in geographical zones each progressively further from a central control communication terminal typically located at the distribution network substation. Reduction of address information in a given message format concurrently affords more interrogating and responding data information which is generally desirable.

SUMMARY OF THE INVENTION

In accordance with the present invention a power line carrier communication system has a branch or pyramid configuration by use of bidirectionally addressable repeaters including an address recognition and a receive and transmit control logic circuits operated in a timed sequence of operations upon activation by an interrogation message transmitted from a central control terminal via one or more of the repeaters to a predetermined remote location. The branch organization of the repeaters includes groups of repeaters connected to the power line conductors of a distribution network so that each group defines a zone of repeaters. Each repeater zone is associated with remote terminals in geographical areas at progressively further distances from the central control terminal which defines the base or apex of the pyramiding branch configuration of the repeaters. A first or zone A repeater group forms the primary branch paths each extending to a separate group of intermediate branch paths including as many groups of second or zone B repeaters as there are primary branch paths. Further branch paths are formed including third and zone C repeater groups similarly extending from each separate intermediate branch paths. The latter branch paths are the furthest terminal branch paths in one preferred embodiment. Remote communication terminals are coupled in signal communication with the power line conductors for receiving and transmitting signals between an adjacent repeater in any of the zones depending on the correspondingly similar geographical locations of the remote terminals and repeaters with respect to the power lines.

An interrogation message originating at a central control terminal includes repeater address information having groups of repeater addresses in a predetermined segment of data bits in the message format. Each group is associated with a repeater zone and the binary coding of each group is associated with a separate repeater group. Thus, minimum number of data bits are required and simplified address recognition logic are possible since large numbers of repeaters can have identical repeater addresses but are distinguishable because being in different repeater address groups and further distinguished by a different repeater address of a preceding repeater address group. False repeater activation is further prevented by each modifying its own repeater address in the retransmitted interrogate message to a predetermined null code such as all zero bits.

The common address recognition and the receive and transmit control logic of each repeater includes simple programmable repeater zone and repeater address identification for uniquely processing the predetermined segment of repeater addresses in the interrogation message. The repeater's zone identification selects the message bit intervals corresponding to its repeater address group in an address selection time circuit so that its address identification can be properly compared to the repeater address data in an interrogation address circuit.

An address modification circuit removes or nulls the repeater's address data upon interrogation retransmission. The programmed zone identification enables each repeater to recognize its position in the branch paths and to verify if an interrogation signal is to be received from another and preceding repeater that the preceding repeater's address must be null and if it is not, then the present repeater will not be activated by the received interrogation signal. Premature and interfering activation is thus prevented. Each received interrogation message enables the repeater to recognize that it is the last repeater if the data in the repeater address of the subsequent repeater address group is nulled in the case of zone A and B repeaters or when it has a zone identification as a last or zone C repeater.

Upon authenticating the interrogation message address at a repeater it is retransmitted. A timing circuit cyclic controls the repeater operation commencing with the initial receipt of an interrogation message addressed to the repeater. Upon the retransmission of the interrogation message, the timing circuit initiates time wait intervals alerting the present repeater to a response wait condition which has variable times dependent upon the number of subsequent repeaters between it and the remote terminal. When the interrogation message reaches the addressed remote terminal each repeater in the preselected route of branch paths between the central control terminal and the remote terminal will be in the alert standby and response-wait condition ready to receive the response message from the remote terminal. With the preselected route in standby for response, the response message requires only a single data bit for each repeater in the preselected route to sequentially activate the repeaters for the separately consecutive retransmission of the response message to the central control terminal.

Upon receipt of a response message the repeater address segment therein is sampled at the wait-conditioned repeater at the data bit interval of the message corresponding to the repeater's zone identification. A response address comparator circuit authenticates the response message address. The address modification circuit nulls the repeater's corresponding address data bit. Accordingly, each subsequent repeater in the response direction verifies that the address of a preceding repeater is not in the response message to avoid improper or out-of-sequence activation for response retransmission.

In one preferred form of the invention three repeater zones are provided in power line communication systems having a pyramiding branch configuration with the repeater address segment of the interrogation message including six bits with three groups of two data bits. The two data bits provide the repeater addresses of all the bidirectionally addressable repeaters. The data bit positions in the message of the three groups defining an associated repeater zone.

A pair of three position switches of each repeater simply programs it for its zone identification and address identification and corresponding logic identifications are produced in an address selector circuit receiving inputs from the switches. Two pairs of the three position switches connected to the address selector circuit and a control terminal select circuit enables the repeaters to be connected in common with two different branch configurations or networks associated with two different central control terminals. A data bit in the interrogation message identifies the two terminals. These terminals are typically associated with two substations supplying common distribution power line conductors.

The interrogation and response directional logic may be provided by use of different frequencies or by a direction logic circuit responsive to another predetermined data bit in the interrogation message.

The present invention provides repeater retransmitted messages that are steered through bidirectional addressable repeaters automatically defining the branch paths of a preselected route by processing a repeater address segment of the message and further automatically terminating further repeater transmissions in accordance with address segment data while assuring that the repeaters are correctly and sequentially activated one at a time and preventing undesired activation of adjacent repeaters in the system.

These and other features and advantages of the present invention will become apparent from detail description of a preferred embodiment of the invention shown in the drawings briefly described hereinafter.

DESCRIPTION OF A PREFERRED EMBODIMENT

Figure 1:
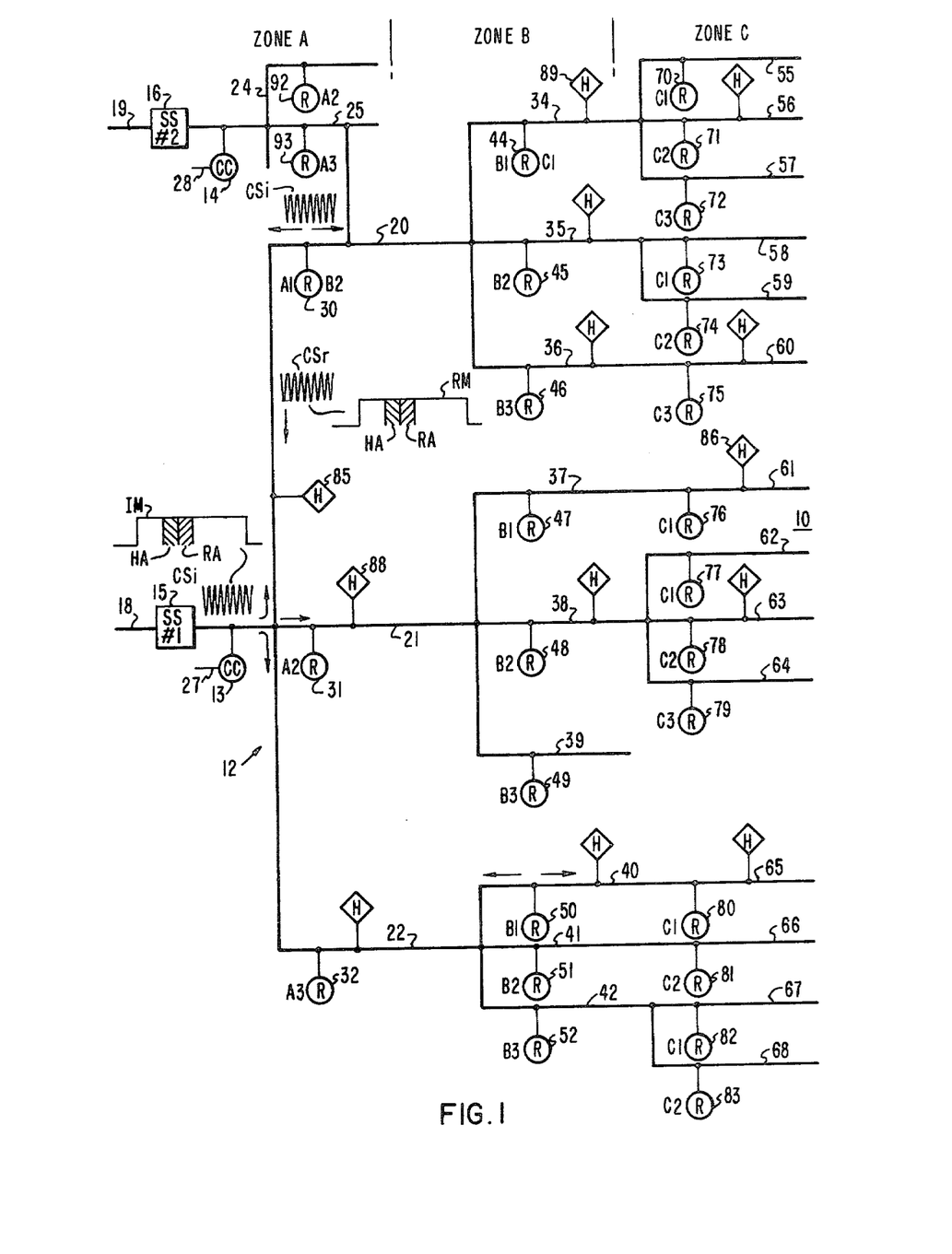
FIG. 1 is a schematic diagram of power line carrier communication system for communicating through bidirectionally addressable repeaters connected to the conductors of a distribution network in a pyramiding branch configuration for operation in accordance with the present invention.

Referring now to the drawing, and to FIG. 1 in particular, there is shown a schematic diagram of a distribution network power line carrier communication system 10 constructed in accordance with this invention. The distribution network power line communication system 10 utilizes an electrical utility distribution network 12 to transmit high frequency communication signals between a central control (CC) terminal 13 or 14, typically located at a distribution substation, 15 or 16, respectively, and a plurality of remote communication terminals designated by diamond boxes with an "H" therein in FIG. 1, normally located at the electrical utility company customer home premises. The network 12 includes two substations 15 and 16 serving common conductors of the network 12. By way of introduction, the general arrangement of the distribution network 12 will be described for a better understanding of the expanding or pyramiding branch configuration of the system 10 in this invention.

By way of example and not of limitation, the distribution network 12 is provided by an electric utility company to distribute alternating electrical power, typically on the order of sixty Hz, from substations 15 and 16 to electrical loads at multiple customer premises. Actual distribution networks include several substations, many branches of primary distirbution conductors, and hundreds of branches of secondary distribution conductors connecting several thousand remote customer loads to the substation. The substations include a high voltage step-down transformer, not shown, which receives high voltage electrical power on its primary winding from a generating site (not shown) through conductors 18 and 19.

The details of the distribution network are not shown but are reviewed briefly hereinafter. The secondary winding of a substation transformer provides power at moderate voltage levels to the distribution network primary conductors which link the substation with a plurality of distribution transformers. The distribution network primary conductors and power line conductors 21, 22, 23, 24 and 25, respectively, which form a single phase, two-wire system. At various intervals along the primary distribution network 12, distribution transformers, not shown, are connected to the distribution netowork primary conductors to transform the moderate voltage carried on the primary distribution conductors to the low voltage power carried by secondary distribution conductors for use by the remote electrical loads. The primary and secondary distribution power line conductors and associated distribution transformers are not shown in FIG. 1 to simplify the drawing. It being understood that the primary and secondary conductors are in signal communication for transmitting carrier frequency signals modulated by message data as noted further hereinbelow.

The carrier communication system 10 associated with the above-described distribution network 12 shown in FIG. 1 will now be described in further detail. The carrier communication system shown in a preferred embodiment of this invention is generally comprised of a master terminal, not shown, typically including a central computer which could be located at the main business office of the electrical utility company. The master terminal is typically connected to the substation central control terminals 13 and 14 via telephone land lines 27 and 28. The terminals 13 and 14 are suitably coupled to the power line conductors at the substations for transmitting interrogation messages to the remote terminals and receiving response messages from the remote terminals. Bidirectionally addressable signal repeaters are generally indicated in FIG. 1 by circles enclosing the letter "R" as they are coupled to the conductors serving as the communication medium for defining pyramidal branch configuration between the terminal 13 and the remote terminals. The repeaters of the present invention are a modification of the general types of power line signal repeaters disclosed in the aforementioned U.S. Pat. Nos. 3,911,415; 3,942,160 and 3,942,168 assigned to the assignee of the present application. In accordance with the aforementioned patents, the central computer may be programmed, for example, to address and interrogate certain remote communication terminals associated with loads connected to the distribution network and obtain data relative to the reading of utility meters or it may request the performance of other functions such as controlling electrically operated hot water heaters.

The interrogation signals prepared by the master terminal computer are sent by any conventional means, such as radio or telephone lines 27 and 28, to a selected central control temrinal typically associated with a particular distribution substation, such as central communication terminals 13 and 14 associated with distribution substations 15 and 16. Central control terminal 13 and 14 are disposed in signal communication with the distribution network conductors by signal couplers described in the aforementioned patents and are operative to generate interrogation messages IM and receive response messages RM which modulate interrogation and response carrier communication signals CSi and CSr, respectively.

In actual practice, the distance between the central terminals 13 and 14 and the remote communication terminals can be considerable. It is known that distribution network conductors possess poor high frequency impedance characteristics and high electrical noise susceptibility; which factors greatly attenuate the high frequency carrier communication signals traveling thereon. To insure that the carrier communication signal generated at the central control terminal is received at the selected remote communication terminal in a usable form, the bidirectinal addressable signal repeaters are disposed along spaced and branch path intervals along the distribution network 12 in accordance with this invention. The signal repeaters R recondition and amplify the carrier communication signal such that it is sufficient to reach either the adjacent and addressed signal repeater or the preselected and addressed remote communication terminal. The signal repeaters may also serve to bypass distribution transformers connected between the primary and secondary conductors of the distribution network 12 which eliminates a primary source of high frequency signal attenuation as noted in the aforementioned patents.

The message address coding and the repeater logic arrangement as described further below reduces the number and complexity of the signal repeaters required to amplify and boosts signals throughout the distribution network communication system. The repeaters minimize and prevent signalling errors by the efficient placement of the repeaters for operation at one-at-a-time activation sequences. These repeater operations are within the constraints of the distances the carrier signals must be transmitted and the limitations of available data bits of fixed length message formats.

The description of the configuration of the pyramidal branch configuration of FIG. 1 is based on the configuration relative to the central control terminal 13 at the substation 15. The three primary repeating branch paths 20, 21 and 22 extend from a base path from the substation and into the zone A which includes the three power line conductors 20, 21 and 22 having the repeaters 30, 31 and 32. Each primary branch path extends to first, second and third groups of intermediate repeating branch paths including power line conductors 34, 35, 36 and 37, 38, 39 and 40, 41, 42 having the associated repeaters 44, 45, 46 and 47, 48, 49 and 50, 51, 52, respectively defining the zone B. Each of the nine intermediate branch paths can extend into three terminal repeating branch paths including a maximum of nine groups of three or twenty-seven such terminal branch paths, partially shown in FIG. 1 to simplify the drawing. Thus, the partially shown terminal paths include power line conductors 55, 56, 57, 58, 59, 60, 61, 62, 63, 64, 65, 66, 67 and 68; and associated repeaters 70, 71, 72, 73, 74, 75, 76, 77, 78, 79, 80, 81, 82 and 83 define zone C.

The communication zone A, B and C repeaters are spaced from each other at distances which the respective transmitters and receivers are responsive to each other. A single carrier frequency is used in both directions of signal transmissions in the one preferred embodiment shown in FIG. 1. The zone A repeaters and remote terminals such as terminal 85 associated with the primary branch paths are in signal communication with the central control terminal 13. The zone C repeaters are in signal communication with the remote terminals such as 86 along the terminal branch paths of zone C. Remote terminals such as 88 and 89 are associated with the primary and intermediate repeating branch paths within the zones A and B, respectively.

The bidirectionally addressable repeaters associated with the branch configuration starting with the central terminal 13 are identified by the associated repeater group zone A, B, or C and the number 1, 2 or 3 of the repeater within its group or its address. Thus, repeaters 31, 32, and 33 are identified in communication zone A by A1, A2 and A3. It is seen that three groups of zone B repeaters include within each group therein three repeaters identified B1, B2 and B3 and the zone C repeaters can include nine groups wherein each group can include three repeaters therein designated C1, C2, C3. These repeater identifications are correspondingly uniquely related to repeater binary and time logic operations when included in message address data defining a preselected communication route between the control terminal and a remote terminal.

It is briefly noted that the bidirectionally addressed repeaters can be used in a second branch configuration associated with control terminal 14 having primary branch paths formed by conductors 24 and 25 in its associated zone A repeaters 92 and 93 but using repeater 30 as a B2 repeater in its zone B and repeater 44 as a C1 repeater in its zone C. Thus, the remote terminal 89 can be in signal communication with either of the substation central control terminals 13 or 14. The manner of this dual branch operation of the repeaters is also described further hereinbelow.

Having described the branch configuration of the system 10 shown, the unique characteristics of the address coding of messages transmitted through the bidirectinally addressable repeaters designated generally "R" in FIG. 1 are now described. Carrier communication signals CSi and CSr are transmitted and received by the central control and remote terminals and the repeaters with frequencyshift key (FSK) modulation in which two frequencies represent different binary states of binary coded information contained in discrete messages having the same binary lengths of data bits. An interrogation message IM having one, thirty-two bit information bearing format is transmitted from the terminal 14, through predetermined repeaters to an addressed remote terminal. Two response messages, one designated RM, having different thirty-two bit information bearing formats are transmitted in immediately successive relationships from the addressed remote terminal, back through the same repeaters to the central control terminal in response to a received interrogation signal.

The interrogation message format includes data bits 0 through 31 intervals with data bit 0 providing a start bit always being a one, data bit 1 providing a substation origin (terminals 13 or 14) or communication branch with zero designating terminal 13 and one designating terminal 14, data bit 2 providing a signal direction with zero designating interrogation. The following message segment of data bits 3 through 16, designated HA, provides remote address information designating either a unique, block or universal address for one or two different groups of remote terminals. The data bits 17 through 22 provide the repeater address segment, designated RA of the message IM in accordance with an important feature of the invention as described further hereinbelow.

The data bits 23 through 25 provide command information for remote meter reading and load control operations to be produced and the remote terminal. The bits 26 through 30 provide a parity check of the message encoded information and data bit 31 provides a stop or end of message designation which is always zero.

The response or reply message format includes two thirty-two data bit words designated WORD 1 and WORD 2. For WORD 1, designated RM in FIG. 1, data bit 0 is a one start of message designation, data bit 1 is not used since the response message is automatically established in the transmission of the interrogation message in accordance with this invention, data bit 2 provides signal direction information by being one to designate the response direction. The following message segment HA of data bits 3 through 16 provides the address of the responding remote terminal. The message segment RA of repeater address includes only data bits 17, 18 and 19, in accordance with the present invention rather than the six data bit intervals of the repeater address segment of the interrogation message. The data bits 20 through 25 provide status information to acknowledge the load control or other commanded instructions in the interrogation message. The same parity check segment of data bits 26 through 30 is provided ending with the stop data bit 30 being zero. The WORD 2 has the same start data bit 0, parity check data bits 26 through 30 and the stop data bit 31. WORD 2 further includes a meter data information message segment provided by the remaining data bits 1 through 25.

The repeater address segments RA of the interrogation and response messages are now described as they are utilized in accordance with the present invention having the bidirectionally addressable repeaters connected in the branch configuration of FIG. 1. In the interrogation address message the data bits 17 and 18 define a first group associated with zone A repeaters, data bits 19 and 20 define a second group associated with zone B repeaters, and data bits 21 and 22 define a third group associated with zone C repeaters. The two data bits of each of the three groups are used to designate the particular repeater or address of the first, second or third repeater of a zone. Thus, one-zero, zero-one, or one-one are the binary addresses for repeaters 1, 2 or 3 of zones A, B and C. If the two data bits of a group are coded zero-zero, it means that a repeater of the associated zone is not used and that the next previous zone provided a repeater that was the last repeater in the route to a remote terminal.

By way of example of the above repeater address concept, the repeater address segment of the interrogation message is coded for addressing the remote terminals 85, 88, 89 and 86, respectively, in the following manner for communication to the central terminal 13. No repeater required to the remote terminal 85, only the repeater A2 (31) to the remote terminal 88, the repeaters A1 (30) and B1 (44) to the terminal 89 and the repeaters A2 (31), B1 (47) and C1 (76) are required in the route to the remote terminal 86. The six repeater address data bits 17 through 22 are binary logical coded as follows: to remote terminal 85, zero-zero, zero-zero, zero-zero; to remote terminal 88, zero-one, zero-zero, zero-zero; to remote terminal 89, one-zero, one-zero, zero-zero; and to the remote terminal 86 zero-one, one-zero, and one-zero. These codes designate the branch paths in the preselected signal routes between the central terminal 13 and the addressed remote terminal.

The data bit 2 will always indicate binary zero for the interrogation or outbound direction meaning that the receive-transmit cycles of the repeaters must go in a predetermined sequence from zone A, to zone B, to zone C only. Each repeater will cause its own address in the retransmitted message to be nulled or to be zero-zero so that the next outbound zone repeater, will require all zeros before its own address. The remote terminal will always receive all zeros in the repeater address data bits. This assures one-at-a-time interrogation retransmit operation of the repeaters in the correct sequence. With each repeater retransmission, that repeater is set or alerted to a response-wait mode status since a response message will be coming inbound back through the same route in response to an interrogation message to the remote terminal.

With above repeater operation in mind for the transmission of an interrogation message, the response message repeater address data segment includes three data parts bits 17, 18 and 19. The bits 17, 18 and 19 are associated or designated zone A, B and C repeater and since the repeaters are in the standby-wait status, the particular repeater address is not required. These data bits 17, 18 and 19 and the response direction data bit 2 (binary one) are required to assure the one-at-a-time response retransmit repeater operation in the correct sequence. The remote terminals always transmit one-one-one in the data bits 17, 18 and 19 in the repeater address segment to further simplify their logic circuit arrangement. As the repeaters receive the response message, they are already conditioned to information as their own position in the route and whether they are the last repeater in the route. In the response and inbound direction each repeater will verify that a previous response repeater transmission nulled its address data bit and then will null or zero its own address data bit upon response retransmission. For zones A and B repeaters which are the first repeaters in the route, such as repeaters 44 and 31, they will not only null or zero their own address data bit but also the address data bits of subsequent, in the interrogation outbound direction, zone repeater addresses. For example, repeater 31 will null all data bits 17, 18 and 19 when retransmitting a response message from the remote terminal 88. Thus, the central control terminal will always receive zero-zero-zero in the received response message repeater address segment.

Having described the positioning and address designations of the repeaters in the branch configuration of FIG. 1 and the coding of the repeater address information data in the repeater address segments of the interrogation and response messages, the logic circuits of the bidirectionally addressable repeaters are now described with reference initially to FIG. 2.

The bidirectionally addressable repeater 30 is described hereinafter, it being understood that each of repeaters shown in FIG. 1, all generally represented by the encircled letter "R", have identical circuitry. A response or interrogation message modulated carrier communication signal is received from the power lines at a receiver 100. The receiver 100 can be any standard receiver adapted for detection and demodulating the high frequency carrier commuciation signals such as shown in greater detail in the above-identified U.S. Pat. No. 3,911,415. The outputs from the receiver 100 include a carrier detect (CD) two-level logic signal and a receive data (REC DATA) signal which is the demodulated binary logic one or zero of the interrogation or response messages having the address and the information in the thirty-two data bit formats as noted hereinabove. An address recognition and receive and transmit control logic circuit 102 receives the CD and REC DATA logic signals. Similarly, a transmitter 104, which can be as also described in the U.S. Pat. No. 3,911,415, receives a DATA input which modulates a retransmitted carrier communication signal, such as CSi', when also receiving a transmit (Tx) ENABLE signal in accordance with the operation of the logic circuit as described further hereinbelow.

The CD signal and REC DATA signals are applied to an AND gate 106 which has an output applied to the ENABLE flip-flop gate 108. The gate 108 is inhibited by the outpput of OR gate 109 receiving $\overline{CD}$ and $\overline{REPEAT}$ logic signals. The ENABLE logic signal starts operation of the circuit 102 by releasing the reset condition of timing counter circuits in the circuit 102.

An important feature of the circuit 102 is the address selector circuit 110 having inputs from manually operated switches designated in the switch circuit box SW designated by the numeral 112. The switches program the circuit 110 to produce identification of the repeater's own address. The circuit 110 is described in further detail in connection with description of FIG. 3. One of the repeater's addresses at repeater 30 is designated A1 in the first and complete branch configuration of FIG. 1. The switch circuit 112 is set to program the circuit 110 outputs A,B,C and S1 and S2 with address identification corresponding to the repeater address A1. The A output of circuit 110 provides a true logic state and B and C outputs provide false logic state so these outputs identify the repeater's communication zone status or zone A in the one address of the repeater 30. For zone B and C repeaters the circuit 112 is set so the output B is true and outputs A and C are false and the output C is true and outputs A and B are false, respectively.

The S1 and S2 outputs of the selector circuit 110 identify the repeater's address within its zone, i.e. is it the first, second or third repeater in its group of zone repeaters. The switch circuit 112 programs the circuit 110 so its 1, 2 or 3 address is a one-zero or zero-one or one-one binary logic. Thus, the A1 repeater 30 is programmed so that the S1 is true and S2 is false. Thus, each repeater is programmed to identify its zone category at circuit 110 outputs A, B or C and, correspondingly, which zone it is not in, and which repeating step it has in the sequence of one-by-one retransmissions in the interrogation and response directions. Each repeater is further programmed to identify its own address in its repeater group. In the case of zones A and B repeaters they are able to identify which group they are in by receiving the data bits of the previous repeater which will indicate which repeater and branch path is inbound thereof and originating its group. The foregoing address identification logic of the circuit 110 is made with recognition of the interrogation message repeater address segment where implicitly the first group of data bits 17 and 18 imply zone A repeaters, the second group of data bits 19 and 20 imply zone B repeaters and the third group of data bits 21 and 22 imply zone C repeaters.

Figure 3:
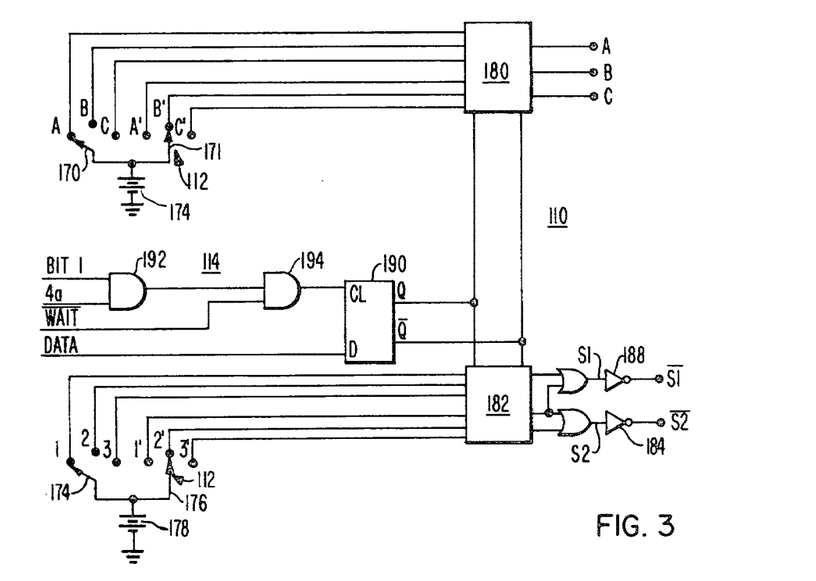
FIG. 3 is a circuit diagram of an address selector circuit included in FIG. 2.

The selector circuit 110 can have either of two self-address identifications at the S1, S2, A, B and C outputs in response to the Q and $\overline{Q}$ inputs from the branch system or control terminal logic circuit 114. As shown in FIG. 3 the switch circuit 112 has two sets of switches for programming two self-identifying repeater addresses so that the repeater 30 can have either the A1 or B2 as shown in FIG. 1. Accordingly, any of the repeaters can have any two of the addresses, A-1, 2 or 3; B-1, 2 or 3; or C-1, 2 or 3 depending upon their positions in the two branch configurations separately controlled by terminals 13 or 14.

Before the logic circuit 102 is generally described based on its sequence of operation, it is to be noted that a timing circuit 116 of the circuit 102 produces a number of timing and sequence control related signals in operation of the circuit 102. A source 118 of clock signals formed by a crystal controlled oscillator produces clock signals to a divide-by counter circuit 120. The predetermined timed signal outputs of the counter circuit 120 are applied to a multiphase strobe pulse source 122 sequentially producing strobe pulses 2a, 4a and 6a during each data bit interval. A bit decoder circuit 124 produces timing reference bit interval bits 0 through 31 in synchronization with the data bits of received interrogation and response messages and retransmitted interrogation and response messages. The synchronization is initiated by the ENABLE logic signal initiated by each received message. A data word or state counter circuit 126 also receives an output from the counter circuit 120 and is synchronized by the ENABLE signal. Data word timing periods are sequentially produced at the outputs of the counter circuit 126 in which '0', '1', '2', '3', '4' and '5' word or state time periods and a REP RESEL coinciding with 5' output. These state times are utilized so that the repeater logic circuit 102 can keep track of its separate operations during the interrogate and response modes. Briefly, the interrogation mode includes three states followed by a repeater reset REP RESET output from the counter circuit 126 and the interrogation mode includes five states followed by a REP RESET output. The interrogation mode includes receiving an interrogation message, processing a message preamble to enable and turn on the transmitter 104, retransmitting the interrogation signal, and resets. The response mode, receives WORD 1 response message, receives WORD 2 response message, processes preamble for transmitter turn on, retransmits WORD 1 response message, retransmits WORD 2 response message and resets. It is noted that the repeater transmitters are on one-at-a-time only during a retransmit message cycle and then turn off. The repeaters normally are on except that they will not respond to any message while its transmitter is transmitting.

When an interrogation message is initially received at the receiver 100, the thirty-two data bits begin repeater processing and the start data bit 0 initiates the ENABLE signal, and the timing circuit 116 begins producing the timing signals. The timing reference interval bits 0 through 31 then match the received message data bits 0-31.

The data bit 1 logic state is tested at control terminal selector 114 and the Q and $\overline{Q}$ outputs will produce the desired S1, S2, A, B and C outputs, it being assumed they identify the A1 address of repeater A1 receiving the interrogation message from terminal 13, for example. A direction logic circuit 130 tests the data bit 2-logic state zero to initiate an ENABLE INT signal. This maintains the interrogation status of the repeater logic circuit 102.

Figure 7:
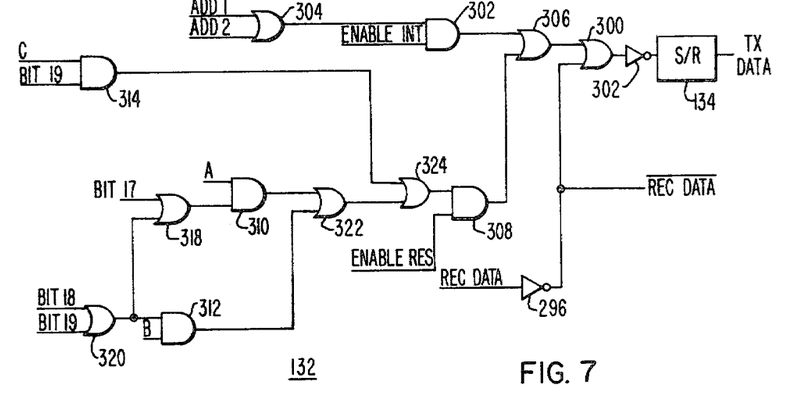
FIG. 7 is a circuit diagram of an address modify circuit included in FIG. 2.

An address modifier circuit 132 shown in detail in FIG. 7 receives REC DATA from the receiver 100 and passes it to a shift register message storage circuit 134 which stores a maximum sixty-four data bits, i.e., one interrogate message word or two response message words. The output of the circuit 134 is transmitter data TX DATA which will be the same as the REC DATA except for the modification in the repeater address segments of the interrogation and response messages. These repeater address modifications are performed in the modifier circuit 132 described further hereinbelow.

The interrogation address data bits 3 through 16 are then stored in the storage circuit 134 with the previously stored data bit 0, bit 1 and bit 2.

Figure 4:
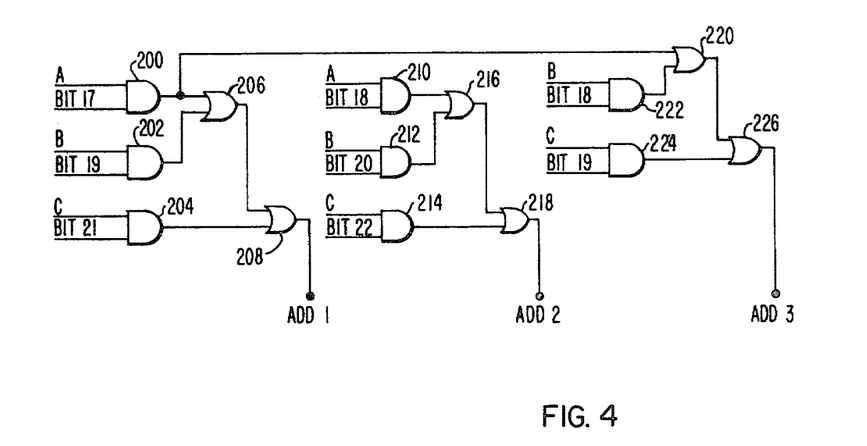
FIG. 4 is a circuit diagram of an address selection time circuit included in FIG. 2.

Important features of the address recognition and receive and transmit control logic circuit 102 are activated at the data bit 17 beginning of the interrogation message repeater address segment. An address selection time circuit, shown in more detail in 4, receives the internal reference interval bits 17 through 22 and the A, B and C outputs of the address selector circuit 110. The interrogation address decode time bits ADD 1 ADD 2 outputs go true during the first and second data bit times for the repeater's own group identification or zone during the interrogation message. Thus, the ADD 1 and ADD 2 logic signals are true only during bit 17 and bit 18 or during bit 19 and bit 20 or during bit 21 and bit 22 intervals for zone A or B or C repeaters, respectively. These three conditions are controlled by the A, B or C true logic states of the selector circuit 110 outputs.

Figure 5:
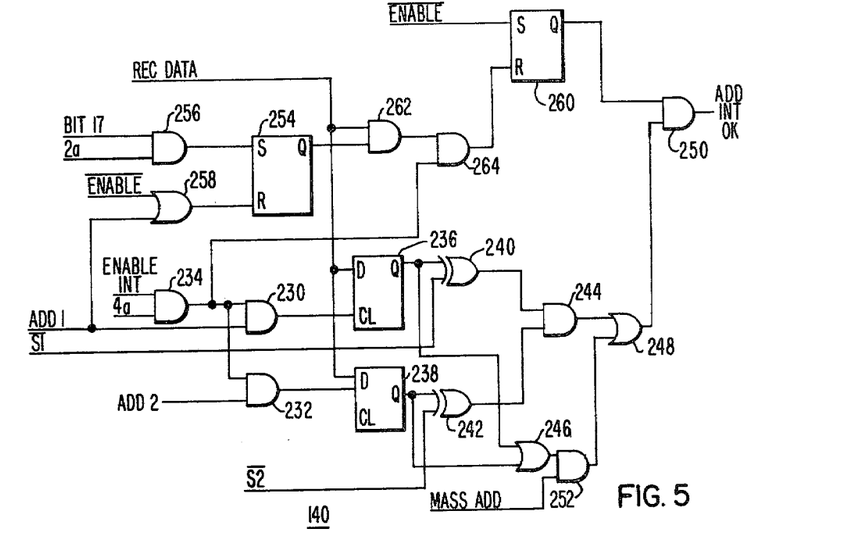
FIG. 5 is a circuit diagram of an interrogation address comparator circuit shown in FIG. 2.

An interrogation address comparator circuit 140 shown in further detail in FIG. 5 receives the ADD 1 and ADD 2 logic signals and the $\overline{S1}$ and $\overline{S2}$ signals (actually the inverse thereof S1 and S2, as shown in FIG. 5) and the A, B and C signals from the selector circuit 110, and the REC DATA data bits. The S1 and S2 self-repeater address logic signals will be compared with the received data bit repeater address during interval bits 17 and 18 or during interval bits 19 and 20 or during interval bits 21 and 22 if the repeater is programmed to identify itself as a zone A or B or C repeater, respectively. If the selected group of address data bits match the programmed self-address signals S1 and S2, an address interrogation authentication (ADD INT OK) logic signal goes to a true state. This indicates that the proper repeater is being addressed in the preselected route for retransmission.

The address selection time circuit 136 produces a response address decode time bit 3 (ADD 3) signal only in the response mode. Since the response message has only address data bits 17, 18 and 19, the ADD 3 logic signal goes true only when the interval data bit corresponds to the self-identified repeater address as a zone A, B or C repeater. The ADD 3 goes true at bit 17 for zone A repeaters, at bit 18 for zone B repeaters, or at bit 19 for zone C repeaters. Before describing the response address decoding feature in the circuit 102, the other logic operations occurring during the repeater address segment of the interrogation message is described hereinafter.

The address modifier circuit 132, previously noted as passing the REC DATA data bits to the storage circuit 134, receives interval data bits 17, 18, 19 and 20 from the decoder circuit 124, ADD 1 and ADD 2 and ENABLE INT and ENABLE RES logic signals. The A, B and C outputs of the address selector circuit 110 are also applied to circuit 132. Two portions of the modifier circuit 132 are alternately enabled during the interrogation and response modes by the ENABLE INT and ENABLE RES logic signals. The circuit 132 performs a data bit logic null forcing function so that the interrogation address data bits associated with the repeater are both zero upon retransmission. Thus, when the zone A, B or C repeaters retransmit an interrogation message, the data bits 17 and 18 are both forced to zero, the data bits 19 and 20 are both forced to zero, and the data bits 21 and 22 are both forced to zero, respectively. In the response message retransmissions the repeater's own response address bit is forced to zero upon response message retransmission.

A further feature in the response mode is required since zone A or zone B repeaters may be the last repeated of a preselected route, for example zone A and B repeaters 31 and 44 retransmit interrogation messages to and receive originating response messages from remote terminals 88 and 89 respectively. Since the remote terminals always transmit one-one-one binary logic states in the response data bits 17, 18 and 19, the zone A and B repeaters, when last, must null their own address data bit and the subsequent address data bits of unused subsequent zone repeaters. Thus, the modifier circuit 31 nulls the received response data bits 17, its own, as well as data bits 18 and 19 when the response message is received from the remote terminal 81.

A parity check circuit 144 performs a complex error check on the data bits of REC DATA contained in the received message to ensure that the message has been received in its proper form. If the selected parity convention is met, the parity check circuit 144 will generate a PARITY OK signal which is ADD'ed at AND gate 146 and an ADD INT OK signal from OR gate 148. The output of the gate 146 sets flip-flop 176 and creates a TX ENABLE signal which energizes transmitter 104. When the TX ENABLE signal is generated, each bit of the data which has been stored in a shift register storage circuit 134 is AND'ed at AND gate 150 with an appropriate clock signal and the retransmitted message is passed on to transmitter 104. The REPEAT logic output of gate 146 is inverted and applied to gate 109.

Figure 8:
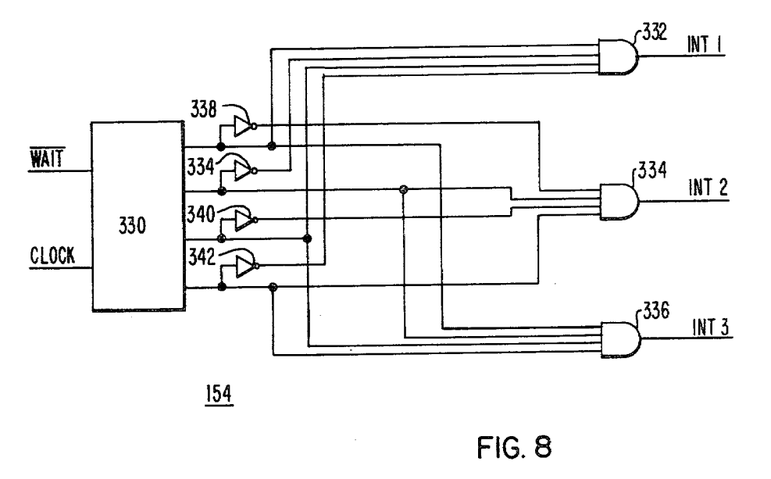
FIG. 8 is a circuit diagram of a wait-interval generator circuit included in FIG. 2.

The interrogation mode of operation of the repeater logic circuit 102 further includes the operation of wait-intervals generator circuit 154, shown in further detail in FIG. 8, and an end of wait and who-is-last logic circuit 156 in the timing circuit 116. The circuit 154 alternately generates three response wait-interval signals INT 1, INT 2 and INT 3 to alert the repeater to a response-wait mode at the end of the received interrogation signal. Since repeaters in different zones will receive the response message at different times, the response wait durations have to be different. The zone A repeaters must have a first wait-time interval to receive a response message directly from a remote terminal, a second wait-time interval, twice the first, to receive a response message from a remote terminal and a B zone repeater, and a third wait-time interval, three times the first, to receive a response message from a remote terminal, a C zone repeater and a B zone repeater.

The INT 1, INT 2 and INT 3 signals are developed in response to $\overline{\text{WAIT}}$ logic signal to initiate the INT 1 and INT 2 and INT 3 logic signals. These last-named signals are used in the circuit 156 to generate an END WAIT logic at the end of the response wait interval required for a particular repeater in a preselected route. A flip-flop circuit 158 receives the END WAIT signal and the output of AND gate 159 receiving 6a strobe and bit 31 inputs to generate WAIT and $\overline{\text{WAIT}}$ logic signals at the outputs of the circuit 158 at the end of the received interrogation message.

The logic circuit 156 receives, in addition to the INT 1, INT 2 and INT 3 signals, the A, B and C outputs of the address selector circuit 110 and the REC DATA data bits. Since the one A, B and C output is true at the pairs of interval bits 17 and 18, 19 and 20 or 21 and 22, which correspond to the addressed repeater's zone, the circuit 156 can determine the addressed repeater's relationship to preceding and/or subsequent repeaters in the preselected route and if it is the last repeater in the route.

An addressed repeater logic will recognize if it is a last repeater when both data bits in the pairs of data bits 19 and 20 and for 21 and 22 are both zero when applied to the circuit 156 from the REC DATA data bits. A zone A repeater has the A output true at data bits 17 and 18 and if the six repeater address bits have a one in either or both data bits 17 or 18 and zeros in data bits 19 through 22, it recognizes it is a last repeater and develops the short wait interval since it will immediately receive a response message from an adjacent remote terminal. A B zone repeater will also develop a short wait interval it is last, and the repeater address segment received at the circuit 156 will have both data bits 17 and 18 zero, either or both of the data bit 19 and 20, and both data bits 21 and 22 zero. An intermediate wait interval is generated by an A zone repeater when followed by a B zone repeater which is last. The circuit 156 of the A zone repeater will receive data bits 17 and 18 with either or both one, data bits 19 and 20 with either or both a one, and both data bits 21 and 22 one. It is apparent that a C zone repeater will always generate a short wait interval and only A zone repeaters can generate the long wait intervals.

The circuit 156 establishes the required long, intermediate or short wait interval for its repeater logic circuit and when this wait interval terminals, it initiates the END OF WAIT logic signal. Also an RES OK logic signal is produced at the output of the circuit 156 at the repeater which is last.

As noted hereinabove after the logic circuit operations occur as described herein during the interrogation message data bits 17 through 22, the message data bits are stored in the storage circuit 134, and the parity check circuit 144 initiates the parity OK at the data bit 30 and the REPEAT logic signal and TX signals cause the interrogation message to be retransmitted from the transmitter 104. The state counter circuit 126 will generate the REP RESET to disable the transmitter 104 at the end of retransmit. The REPEAT true logic state applied through OR gate 109 prevents an ENABLE true state from gate 108 while the transmitter 104 is active to retransmit a message. The logic circuit 102 cannot be receiving any messages or data when the repeater is transmitting.

The response mode of operation of the logic circuit 102 occurs while the repeater is alerted to the response-wait mode. The wait logic signal must be true to generate an ENABLE RES true signal when REC DATA is received with a data bit at binary one in the response message. A response address comparator circuit 160, not previously noted and shown in detail in FIG. 6, produces a response repeater address authentication or ADD RES OK logical true signal state. The ADD RES OK true state passes through the OR gate 148 to form the same logic function at gate 146 as the ADD INT OK true signal state does in the interrogation mode.

The selection time circuit 136 produces the ADD 3 true at the repeater's own address bit time in the response repeater address segment of the response message. The REC DATA signals apply the data bits 17, 18 and 19 to the circuit 160. The one important condition of the comparator circuit 160 is receiving the RES OK true signal when the repeater is the last repeater and receives the remote terminal's inbound response transmission. The remote terminal always responds with all binary ones in the message data bits 17, 18 and 19 so the circuit 160 will authenticate the one logic at its address bit time to produce the ADD RES OK true. Another important feature of the circuit 160 is that it checks the subsequent address data bits after the repeater's ADD 3 time to assure that the data bit or bits of previous repeater or repeaters in the outbound direction have nulled their data bit or bits to zero. These repeaters are subsequent in the interrogation path. In the case that a repeater is the last repeater position, the RES OK true logic of the circuit 156 will override the subsequent data bit checking operation to maintain the ADD RES OK logic true even through ones will appear in the subsequent address data bits of the data parts of the response message address segment applied to zone A or B repeaters which are in the last position. The checking feature prevents the incorrect leap-frogging of the response message. This maintains the proper one-at-a-time sequence of repeater retransmissions of the response message. The interval bit 20 input to the circuit 160 deactivates the checking feature since the last data part of the three bit repeater response address is data bit 19.

The address modifier circuit 132 is effective in the response mode to null the repeater's own address data bits and the subsequent address data bits when the repeater is a last repeater. Since the circuit 132 receives the A, B and C outputs of the address selector circuit 110 with the REC DATA, it is conditioned with the repeater's own address and can force it address bit in the REC DATA to zero. The subsequent address data bits will be forced to zero when the repeater is the last repeater. For example, if the repeater is last, such as repeater 31 for terminal 88, the response message will include all ones in the repeater response address data bits 17, 18 and 19. The circuit 132 will null all the address bits to zero, its own and all subsequent, and retransmit all zeros in the address data bits to the central control terminal 13.

The address recognition and receive and transmit control logic circuit 102 processes response messages as generally described hereinabove. After the DATA REC begins passing through the circuit 102 the data bit 1 is not processed by the circuit 114 because of the $\overline{\text{WAIT}}$ logic signal indicating the circuit is in the response wait mode. This establishes the branch paths and associated repeaters to transmit the response message from a remote terminal to the originally sending central control station 13. The direction data bit 2 one state is checked in the circuit 130. The WAIT logic input is used to develop WAIT and $\overline{\text{WAIT}}$ logic signals in the circuit 130 so that ENABLE INT true can be produced only when the repeater is not in the wait mode and ENABLE RES can be produced when the trepeater is in the WAIT mode. This provides the arming or alerting conditioning of the repeaters with the response-wait mode.

The remaining data bits of the response message are processed as described hereinabove especially noting the operation of the address comparator circuit 160 and the address modifier circuit 132. The two, thirty-two data bit words of the response message are shifted through and out of the storage circuit 134 during retransmission of the response message from the transmitter 104. The REP RESET logic goes true to return the repeater to its normal line condition so as to be listening for an interrogation message having its repeater address.

The FIGS. 3 through 8 show details of the corresponding circuits shown in block diagram in FIG. 1.

FIG. 3 illustrates the address selector 110 and associated switch circuit 112 and the control terminal selector circuit 114. The upper portion of the switch circuit 112 has two, three-position selector switches 170 and 172 for programming and presetting the repeater's zone identifications for the two control terminals 13 and 14 associated with the two interconnected branch configurations of FIG. 1. The A, B and C switch positions are for the terminal 13 and the A', B' and C' positions are for the terminal 14. A voltage source 174 is connected through the switches 170 and 171 to two of the six conductors connected thereto. Correspondingly, the lower portion of the switch circuit 112 includes two, three-position selector switches 176 and 178 for presetting the repeater's two, two-bit address identifications. The switches 174 and 176 are associated with the control terminals 13 and 14, respectively. These switches also apply a voltage source 178 to two of the six conductors connected to the switch's outputs. Two, two-channel data selector circuits 180 and 182, being of a type 14519B, receive the six outputs of the switches 170 and 171 and the six outputs of the switches 174 and 176. Thus, either of two programmed A, B or C zone identifications A, B or C is presented at the outputs A, B and C of the circuit 180. Either of two programmed two-bit binary identifications S1 and S2 are provided by applying three of the outputs of the circuit 182 to the OR gates 184 and 186, as shown. The OR gate outputs are applied through inverters 188 and 189 to produce the $\overline{S1}$ and $\overline{S2}$ complements of S1 and S2.

The two programmed addresses are selected by the circuit 114 having a flip-flop circuit 190 having Q and $\overline{Q}$ outputs connected to the control inputs of the circuits 180 and 182. The two opposite binary states of Q and $\overline{Q}$ control which of the repeater programmed addresses is to be selected for repeater addressing from the terminal 13 or terminal 14. The terminal origin data bit 1 is applied to the circuit 190 for triggering of the flip-flop by strobe pulse 4a which is gated through the AND gate 192 at the interval bit 1. The $\overline{WAIT}$ is applied to the input of an AND gate 194 receiving the output of the gate 192 so as to inhibit the input to the clock input of the circuit 190 when the repeater is in the response-wait mode.

The FIG. 4 is a circuit diagram of the address selection time circuit 132. The repeater's own address bits are time related to the bit intervals associated with its zone identification. The one programmed zone A, B or C will have a high true logic status on one of the A, B, or C inputs to the AND gates 200, 202 or 204 respectively. The interval bits 17, 19 and 20 are also applied to the gates 200, 202 and 204, respectively. The OR gates 206 and 208 which cause the AND 1 output to be a high true when the bit 17, 19 or 21 is true with the one logic true of A, B or C. This implicitly selects the message repeater address group relative to the repeater's zone indentification and the first bit of its address identification. The AND gates 210, 212 and 214, respectively, receive A output and bit 18, B output and bit 20, and the C output and bit 22. The OR gates 216 and 218 are connected to the last-named AND gates to produce the ADD 2 interrogated address decode time bit which is the second address bit of the repeater's own address. The ADD 1 and ADD 2 signals are used to select and decode the corresponding two data bits of the two data bit group in the interrogation address message segment. For the response message three-bit repeater address segment, the AND gate 200 output is applied to the OR gate 220. The A output and bit 18 are applied to the AND gate 22 also connected to the OR gate 220. The AND gate 224 receives the C output and bit 19 so that its output is applied to the OR gate 226 receiving another input from the OR gate 220. The ADD 3 response address decode time bit is produced by the OR gate 226 for use in the response repeater address operations.

In FIG. 5 the circuit diagram of the interrogation address comparator 140 is shown. The circuit receives the ADD 1 and ADD 2 logic signals and they are applied to the AND gates 230 and 232 for conditioning the interrogation address decode function thereof to look to the repeater's own two-bit address code of $\overline{S1}$ and $\overline{S2}$ at the repeater's corresponding address group in the message address segment. The AND gate 234 receives the ENABLE INT and strobe pulse 4a to disable the gates 230 and 232 during the response mode. The flip-flop circuits 236 and 238 receive the strobe pulse 4a at their clock inputs from the gates 230 and 232. The data inputs of the circuits 236 and 238 receive the REC DATA data bits. The Q outputs of the circuits 236 and 238 are each applied to separate exclusive OR gates 240 and 242 which also receive the $\overline{S1}$ and $\overline{S2}$ logic signals respectively. The outputs of the exclusive OR gates are applied to AND gate 244. The Q outputs of the circuits 236 and 238 are applied through OR gate 246. The AND gate 244 output is applied to the OR gate 248 when the repeater's identification address matches the address data bits to be applied to the AND gate 250 for producing ADD INT OK true logic if no previous repeater addresses are in the REC DATA. The output of the OR gate 246 is applied to an AND gate 252 which also receives an universal address MASS ADD logic signal in one preferred form of the invention. All repeaters receiving an interrogation message with any ones in the message repeater address segments will produce an ADD INT OK logic true when MASS ADD is true for mass addressing of the repeaters.

The flip-flop circuit 254 receiving inputs from the AND gate 256 and OR gate 258 and the flip-flop circuit 260 receiving the outputs of the AND gates 262 and 264 as shown in FIG. 5 prevent the ADD INT OK output at gate 250. The bit 17 input at gate 256 starts the checking the first address data bit 17 in the received message address data bits test for binary ones if the repeater is a zone B or C repeater. The flip-flop 254 will detect the erroneous previous repeater address data bits. The flip-flop 260 will hold the AND gate 250 disabled when the gate 254 detects the previous repeater address data bits indicating that this repeater is not to be addressed at this time.

Figure 6:
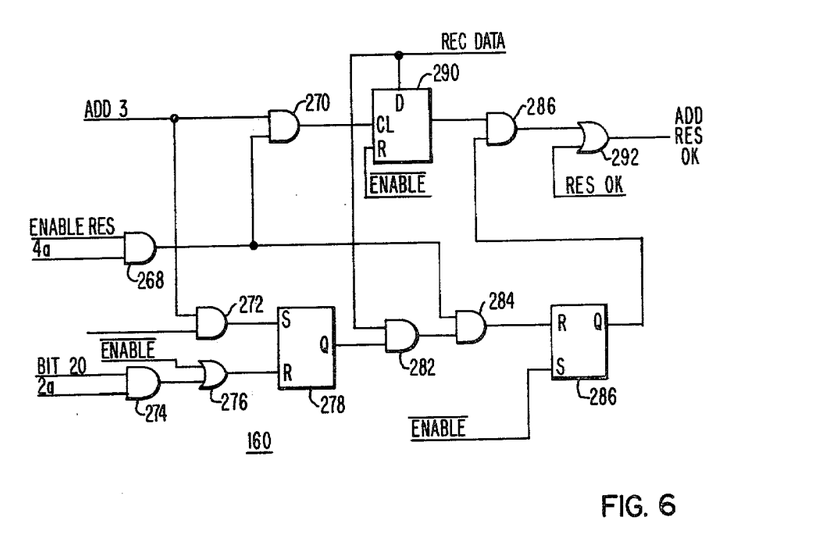
FIG. 6 is a circuit diagram of a response address comparator circuit included in FIG. 2.

FIG. 6 illustrates the response address comparator circuit 160 which is enabled by the ENABLE RES logic true signal at the AND gate 268. The ADD 3 signal is applied to the AND gates 270 and 272 to enable them at the interval bit time that a repeater's own response address is to be checked. The bit 20 and strobe 2a applied to the AND gate 274 having its output applied to an OR gate 276 also receiving the $\overline{ENABLE}$ signal. The flip-flop circuit 278 is reset at the interval bit 20 to end operation of the circuit 160 which is required only during bits 17, 18 and 19. The flip-flop circuit 278 is enabled to sense if a subsequent address is being received to erroneously activate the repeater in the response message route. The AND gate 282 receives the Q output of the flip-flop 278 and the REC DATA. The AND gate 284 receives the AND gate 282 output and strobe pulse 4a and has its output connected to the flip-flop 286. The flip-flop 286 is normally set, but is reset if there are ones in the subsequent repeater address data bits. The AND gate 288 is normally enabled by the set state of the Q output of flip-flop 286 and further receives the Q output of a D type flip-flop 290. REC DATA is applied to the flip-flop 290 and it in effect stores the present repeaters one address which needs to be saved in the case of A and B zone repeaters. The repeater's own response address always has to be one at its address decode time as indicated by the ADD 3 signal. The Q output is a logical true and is applied through the AND gate 286 as the logical true of the Q output of the flip-flop 286 is present indicating no previous address data bits. This produces the ADD RES OK output at the OR gate 292.

Figure 2:
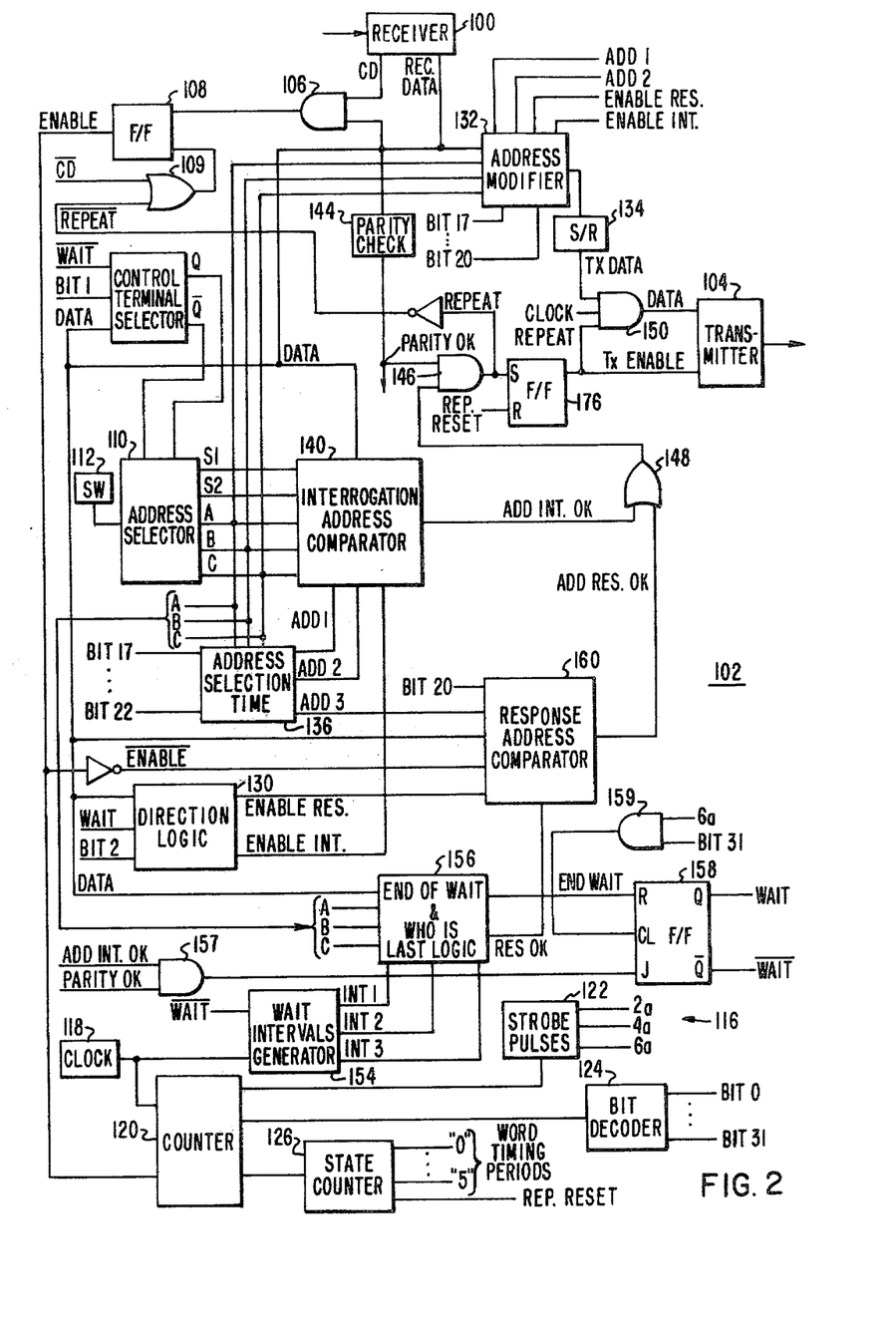
FIG. 2 is a logic block circuit diagram of the bidirectional repeater shown in FIG. 1.

If the repeater is at last repeater in the route, the circuit 156 in FIG. 2 produces the RES OK logical true which also produces the AND RES OK logical true. Thus, the response address decode is overridden when the repeater is a last repeater.

FIG. 7 illustrates the circuit arrangement of the address modifier circuit 132 and message storage circuit 134. REC DATA passes through the inveter 296 and the OR gate 300 through the inverter 302 to the shift register storage circuit 134 which is a type CD4031. The REC DATA which passes directly through the OR gate 300 to the circuit 134 except where repeater address modification is required in address data bits 17 through 22 in the interrogation mode or address data bits 17, 18 and 19 in the response mode.

The AND gate 303 is enabled by ENABLE INT logic true, so that the ADD 1 and ADD 2 logic true signals pass therethrough from the OR gate 304 to the OR gate 306. The concurrent occurrence of a one in a data bit and a one at ADD 1 or ADD 2 causes a one at the gate 300 output which is inverted to a zero by inverter 302. The OR gates 300 and 306 provide the nulling of the repeater's own address data bit by the "forcing" action of the gate 300 and the inverter 302 when the gate 300 is receiving $\overline{REC\ DATA}$.

The AND gate 308 is enabled by ENABLE RES during the response mode and receives the address bits to be nulled by the gate 300 and inverter 302 at the appropriate interval bit 17, 18 and 19. The A, B and C outputs from the address selector circuit 110 are applied to the AND gates 310, 312 and 314, respectively. The gate 314 receives the bit 19 so that the address data bit 19 is always changed to zero in the circuit 134. The bit 17 is applied to OR gate 318 which also receives the output of OR gate 320 receiving both bits 18 and 19. The gate 318 output is applied to the AND gate 310 and the gate 320 output is applied to gate 312. OR gate 322 receives both outputs of gates 310 and 312 and its output is applied with output of gate 314 to the inputs of the OR gate 324 having the output thereof connected to the other input of gate 308. The zone repeaters A or B will have their own address data bits changed to zero in storage circuit 134 since both inputs to the AND gates 310 and 312 will be true at bits 18 or 19. The circuit 132 also nulls all subsequent repeater address bits when zone A or B repeaters are last. For example, if a zone A repeater is last, the A input to gate 310 is logically true so that the logical true of bits 17, 18 and 19 pass through OR gate 322 to return the data bits 17, 18 and 19 to zero. If a B zone repeater is last, the B input is a logical true and A is a logical false so the gate 310 is inhibited but the AND gate 312 will pass the logical true of bits 18 and 19 to the OR gate 322 and provide zeros in the stored data bits 18 and 19.

FIG. 8 illustrates the details of the wait intervals generator circuit 154 for generating the wait interval signal INT 1, INT 2 and INT 3. The circuit 154 includes a divide-by counter 330 which counts the clock input signals and the outputs commence counting when the wait mode commences as controlled by the $\overline{WAIT\ SIGNAL}$. As noted hereinabove the wait mode starts at the end of the receiving of the interrogation message. The four outputs of the circuit 330 are connected both directly to the AND gates 332, 334 and 336 and through the inverters 338, 340, 342 and 344 to the gates 332, 334 and 336. The INT 1 time interval has the short time length, the INT 2 time interval has the intermediate time length twice INT 1, and the INT 3 time interval has long time length three times INT 1. These short, intermediate and long times may be either 2.5, 5 and 7.5 seconds, respectively, or 1.25, 2.5 and 3.75 seconds respectively.

The communication system 10 with the pyramidal branch configuration for the electric power distribution network 12 supplied by the substation 15 and interconnected for being at least partially supplied by the substation 16, has central control terminals 13 and 14 efficiently linked to a maximum of thirty-nine bidirectionally addressable repeaters R in a single branch configuration when the repeaters are made in accordance with this invention as shown in FIGS. 2 through 8 for receiving interrogation and response messages having repeater address segments thereof arranged and encoded as also described in detail hereinabove.

While a preferred form of the present invention has been described, it is contemplated that modifications and alterations may be made thereto without departing from the spirit and scope of our invention.

We claim:

1. A power line carrier communication system for an electric power distribution network characterized by power line conductors being defined in a pyramidal branch configuration so as to fan out in an outbound direction from a common base branch portion initially in a group of primary branch portions extending from said base branch portion, thereafter in groups of intermediate branch portions with each group thereof extending from one of said primary branch portions, and finally in groups of terminal branch portions with each group thereof extending from one of said intermediate branch portions, said communication system comprising:

plural bidirectionally addressable signal repeater means disposed in signal communication in an inbound direction with a single branch portion of one of said groups and in signal communication in an outbound direction with one of another of said groups of branch portions, the disposition of said plural repeater means defining different communication zones wherein each zone includes one or more common groups of said plural repeater means coupled to a common one of the primary, intermediate and terminal groups of branch portions, and each of said plural repeater means including first programmable logic means identifying a group of the repeater means within a separate communication zone and second programmable logic means producing a binary address identifying a separate one the repeater means within an associated group thereof;

addressable remote communication terminals within each of said communication zones each being in signal communication with a separate branch portion;

a central control communication terminal in signal communication with said base branch portion and including means transmitting a carrier signal modulated with an interrogation message intended for a predetermined remote terminal, said interrogation message including a repeater interrogation address data segment including therein serial groups of repeater address binary encoded data wherein each message address group designates a group of repeater means within a separate communication zone and wherein the repeater address encoded data of each message group designates a separate repeater means of an associated group;

each of said plural repeater means including means receiving and processing said interrogation message modulated carrier signal, means selectively responsive to one of the repeater address data groups in said interrogation address data message segment when corresponding to the communication zone and binary address identified by said first and said second programmable logic means therein, means authenticating the repeater address data of the selected group of the message address segment, means nullifying the repeater address data of the selected group of the message segment by removing the encoded data thereof, means responsive to the repeater interrogation address authenticating means for conditioning the repeater means in a response-wait mode status, and means further responsive to the repeater interrogation address authenticating means for retransmitting a carrier signal modulated by a modified form of the received interrogation message wherein the selected group of repeater address encoded data is removed;

each of said remote communication terminals including means for receiving a carrier signal modulated by an interrogation message having each of the groups of repeater address data nulled in said message address segment thereof and responding thereto by transmitting a carrier signal modulated by a response message having a repeater response address data segment thereof including plural serial data parts wherein each data part designates a group of repeater means within a separate communication zone and wherein all of said data parts have identically binary encoded information so that each remote terminal transmits the same repeater response address data when responding to a received interrogation message;

each of said plural repeater means further including means for receiving and processing a carrier signal modulated by said response message when in said response-wait mode status, means authenticating the repeater response address data of the message address segment when a data part thereof is corresponding to the communication zone identified by said first programmable logic means, means responsive to the last-named address data part for subsequently nullifying the encoded data of said last-named data part by removing the encoded data thereof, and means responsive to the repeater response address authenticating means for retransmitting a carrier signal modulated by a modified form of the received response message wherein the repeater address encoded data of said last-named data part is removed; and said central control communication terminal further including means for receiving a retransmitted modified response message modulating a carrier signal when the message response address segment thereof includes nulled data in the repeater address data parts.

2. The power line carrier communication system as claimed in claim 1 wherein said first and said second programmable means each are manually operated at each of the repeater means.

3. The power line carrier communication system as claimed in claim 1 wherein each of said plural bidirectionally addressable signal repeater means includes address selection time circuit means responsive to said first and said second programmable logic means for producing sequentially occurring interrogation address decode time logic signals during each of separate data intervals defining the occurrence of the group of the interrogation message address data segment associated with the identified communication zone and for further producing a response address decode time logic signal during a data interval defining the occurrence of the data part of the response message address segment associated with identified communication 4. The power line carrier communication system as claimed in claim 1 wherein said interrogation message includes said repeater address data segment having six serial binary data intervals including three pairs of data bit intervals defining three of said groups of repeater address data for designating three separate communication zones, and further wherein the binary states of each pair of data bit intervals designates a separate repeater means of an associated group.

5. The power line carrier communication system as claimed in claim 4 wherein said response message transmitted from one of said remote communication terminals includes said repeater address data message segment thereof having three serial binary data intervals each including a single data bit interval defining said serial data parts thereof for designating the same three communication zones as included in the address data segment of an interrogation message initially transmitted to said one remote communication terminal, so that a separate repeater of an associated zone authenticates one of the three data bit intervals when the separate repeater is in the response-watt mode status.

6. The power line communication system as claimed in claim 1 wherein the electric power distribution network is further characterized by further power line conductors being defined in at least a partial second pyramidal branch configuration having a separate common base branch portion and groups of branch portions extending therefrom with selected ones of the branch portions of said second pyramidal branch configuration including the same power line conductors as do selected ones of the branch portions of said first named pyramidal branch configuration so that preselected ones of said remote communication terminals are in signal communication with both of the branch configurations, and wherein predetermined ones of said plural repeater means are in separate communication zones of both of said pyramidal branch configurations, and said second pyramidal branch configuration further including a second central control communication terminal in signal communication with said base branch path of said second branch configuration including means transmitting a carrier signal modulated with another interrogation message intended for one of said preselected ones of said remote communication terminals, said another interrogation message including a repeater address data segment including groups of repeater address wherein each group corresponds to a group of repeater means within a separate communication zone of said second branch configuration and wherein the repeater address data of each message group corresponds to a separate repeater means an associated group in said second branch configuration, and wherein each of said plural repeater means includes said first programmable logic means having first and second selector means for identifying two groups of the repeater means in two separate communication zones and said second programmable logic means having first and second selector means for producing two binary addresses identifying a separate one of the repeater means within two associated groups thereof, so that each of said plural repeater means is selectively responsive to either of the interrogation messages transmitted through the first-named and the second pyramidal branch configurations from either of the first named and said second central control communication terminals.

* * * * *